United States Patent
Tomioka et al.

(10) Patent No.: US 12,436,105 B2
(45) Date of Patent: Oct. 7, 2025

(54) WATER QUALITY ANALYSIS SYSTEM, SENSOR MODULE, CALIBRATION MACHINE, AND METHOD FOR CALIBRATING WATER QUALITY ANALYSIS SYSTEM

(71) Applicant: HORIBA Advanced Techno, Co., Ltd., Kyoto (JP)

(72) Inventors: Kiichiro Tomioka, Kyoto (JP); Yuta Hashima, Kyoto (JP)

(73) Assignee: HORIBA Advanced Techno, Co., Ltd., Kyoto (JP)

( * ) Notice: Subject to any disclaimer, the term of this patent is extended or adjusted under 35 U.S.C. 154(b) by 986 days.

(21) Appl. No.: 17/595,348

(22) PCT Filed: Mar. 17, 2020

(86) PCT No.: PCT/JP2020/011722
§ 371 (c)(1),
(2) Date: Nov. 15, 2021

(87) PCT Pub. No.: WO2020/235198
PCT Pub. Date: Nov. 26, 2020

(65) Prior Publication Data
US 2022/0221404 A1 Jul. 14, 2022

(30) Foreign Application Priority Data
May 22, 2019 (JP) .................. 2019-095724

(51) Int. Cl.
*G01N 21/64* (2006.01)
*G01N 21/27* (2006.01)
*G01N 33/18* (2006.01)

(52) U.S. Cl.
CPC ....... *G01N 21/6428* (2013.01); *G01N 21/276* (2013.01); *G01N 33/18* (2013.01);
(Continued)

(58) Field of Classification Search
None
See application file for complete search history.

(56) References Cited

U.S. PATENT DOCUMENTS

| | | | | |
|---|---|---|---|---|
| 6,790,664 B2 * | 9/2004 | Bailey | ................ | G01N 33/1853 436/55 |
| 6,790,666 B2 * | 9/2004 | Dang | ................ | G01N 33/1853 436/79 |

(Continued)

FOREIGN PATENT DOCUMENTS

| | | |
|---|---|---|
| CN | 101726459 A | 6/2010 |
| CN | 103328953 A | 9/2013 |

(Continued)

OTHER PUBLICATIONS

ISA Japan Patent Office, International Search Report Issued in Application No. PCT/JP2020/011722, Jun. 9, 2020, WIPO, 4 pages.
(Continued)

*Primary Examiner* — Lore R Jarrett
(74) *Attorney, Agent, or Firm* — Alleman Hall & Tuttle LLP (57) ABSTRACT

A water quality analysis system is calibrated without using any organic fluorescence material such as phenanthrene. The water quality analysis system analyzes a component to be measured contained in a liquid sample by a fluorescence spectroscopy, and that comprises a light irradiation section that irradiates the liquid sample with a light having an excitation wavelength of the component to be measured, a light detection section that detects a fluorescence of the component to be measured emitted from the liquid sample, a calculation unit that calculates a concentration of the component to be measured by using a fluorescence intensity obtained by the light detection section, and a solid fluorescence reference member that is arranged on an optical path between the light irradiation section and the light detection (Continued)

section and that emits the fluorescence by the light from the light irradiation section at a time of calibration.

13 Claims, 6 Drawing Sheets

(52) U.S. Cl.
CPC ............... *G01N 2021/6417* (2013.01); *G01N 2021/6463* (2013.01); *G01N 2021/6497* (2013.01)

(56) References Cited

U.S. PATENT DOCUMENTS

| | | | |
|---|---|---|---|
| 2013/0206971 | A1 | 8/2013 | Kamimura et al. |
| 2015/0300981 | A1* | 10/2015 | Arquint .................. G01N 27/36 204/406 |
| 2016/0139101 | A1* | 5/2016 | Scott .................. G01N 33/1886 73/866.5 |

FOREIGN PATENT DOCUMENTS

| | | |
|---|---|---|
| EP | 2653854 A1 | 10/2013 |
| JP | S53105288 A | 9/1978 |
| JP | 2000250303 A | 9/2000 |
| JP | 2004157018 A | 6/2004 |
| JP | 2008249328 A | 10/2008 |
| JP | 2009192338 A | 8/2009 |
| JP | 2015137983 A | 7/2015 |

OTHER PUBLICATIONS

Masuda, A. et al., "Effect of engine operating conditions on scrubber drainage properties," Research Presentation of 2015 (15th) Japan National Maritime Research Institute, 2015, 21 pages.

European Patent Office, Extended European Search Report Issued in Application No. 20810657.5, Nov. 28, 2022, Germany, 10 pages.

Tedetti, M et al., "Utilization of a submersible UV fluorometer for monitoring anthropogenic inputs in the Mediterranean coastal waters," Marine Pollution Bulletin, Oxford, GB, vol. 60, No. 3, Mar. 1, 2010, 13 pages.

China National Intellectual Property Administration, Office Action and Search Report Issued in Application No. 202080036609.8, Jan. 4, 2024, 15 pages.

\* cited by examiner

FIG. 6

WATER QUALITY ANALYSIS SYSTEM, SENSOR MODULE, CALIBRATION MACHINE, AND METHOD FOR CALIBRATING WATER QUALITY ANALYSIS SYSTEM

FIELD OF THE ART

This invention relates to a water quality analysis system that measures a concentration of a component to be measured by detecting fluorescence generated from the component to be measured contained in a liquid sample, a sensor module used for the water quality analysis system, and a method for calibrating the water quality analysis system.

BACKGROUND ART

An exhaust gas cleaning system (EGCS) is used for removing sulfur oxides ($SO_X$) contained in an exhaust gas discharged from an internal combustion engine of a ship. The EGCS has an $SO_X$ scrubber that desulfurizes the exhaust gas and a scrubber effluent containing polycyclic aromatic hydrocarbons (PAHs) is discharged from the $SO_X$ scrubber. Among these PAHs, phenanthrene is defined as a monitoring criterion by the EGCS guidelines established by the International Maritime Organization (IMO).

A PAH meter using a fluorescence spectroscopy is used as an instrument for measuring a concentration of phenanthrene in the scrubber effluent. Since the concentration of phenanthrene obtained by the PAH meter is considered to be the phenanthrene-equivalent PAH concentration and the concentration of phenanthrene should be kept below a predetermined permissible concentration value, it is necessary to calibrate or check sensitivity of the PAH meter at a predetermined timing.

Conventionally, a method for calibrating the PAH meter using the fluorescence spectroscopy or a method for checking the sensitivity of the PAH meter uses a reference liquid wherein the concentration of phenanthrene is adjusted to a predetermined value.

However, phenanthrene is insoluble in solvent (pure water for reagent) so that it is difficult to prepare the reference liquid at high reproducibility. In addition, phenanthrene is toxic and cannot be easily used on site. Furthermore, phenanthrene is an organic fluorescent substance and fades with light, which limits the time of use and prevents continuous measurement for a long period of time. In addition, it is difficult to obtain the pure water for reagent on a ship.

PRIOR ART DOCUMENTS

Patent Documents

Patent document 1: Japanese Unexamined Patent Application Publication No. 2015-137983

DISCLOSURE OF THE INVENTION

Problems to be Solved by the Invention

The present claimed invention has been made to solve the above-mentioned problems, and a main object of this invention is to calibrate the water quality analysis system without using organic fluorescent materials such as phenanthrene.

Means to Solve the Problems

More specifically, a water quality analysis system in accordance with this invention is a water quality analysis system that analyzes a component to be measured contained in a liquid sample by a fluorescence spectroscopy and is characterized by comprising a light irradiation section that irradiates the liquid sample with a light having an excitation wavelength of the component to be measured, a light detection section that detects fluorescence of the component to be measured emitted from the liquid sample, a calculation unit that calculates a concentration of the component to be measured by using a fluorescence intensity obtained by the light detection section, and a solid fluorescence reference member that is arranged on an optical path between the light irradiation section and the light detection section at a time of calibration and that emits the fluorescence by the light of the light irradiation section.

In accordance with the water quality analysis system, since the solid fluorescence reference member is arranged on the optical path between the light irradiation section and the light detection section during calibration, it is possible to calibrate the water quality analysis system without using a conventional reference liquid. More specifically, it is possible to solve various problems caused by using organic fluorescent materials such as phenanthrene. Since the solid fluorescence reference material does not fade with light and has no toxicity, high uniformity, and high heat resistance compared with the organic fluorescence material, it is possible to improve the workability and convenience during calibration. In addition, a storing method of fluorescence reference members is simplified, and there is no need of considering the lifetime of the fluorescence reference member. Furthermore, inspections using the fluorescence reference member can be performed easily and quickly.

The fluorescence reference member is not particularly limited as long as it is solid, and, for example, a fluorescence glass doped with rare earth ions, fluorescent resin doped with ceramic phosphor in an organic polymer material such as acrylic, or ceramic phosphor powder coated on a glass or organic polymer material member is conceivable. Among them, it is preferable to use the fluorescence glass with high transparency and optical homogeneity. In addition, the solid fluorescence reference member may also be a gel-like material.

As a concrete embodiment of the water quality analysis system conceived is the water quality analysis system that further comprises a sensor head that houses the light irradiation section and the light detection section and that is immersed in the liquid sample. In accordance with this arrangement, in order to improve workability of calibration using the fluorescence reference member, it is preferable that the fluorescence reference member is detachably mounted on the sensor head.

As the liquid sample analyzed by the water quality analysis system of this invention represented is a scrubber effluent discharged from a ship. In this case, it is preferable that the light irradiation section irradiates the light having the excitation wavelength of phenanthrene contained in the scrubber effluent, the light detection section detects the fluorescence of the above-mentioned phenanthrene, and the calculation unit calculates a phenanthrene-equivalent PAH concentration contained in the scrubber effluent by using the fluorescence intensity obtained by the light detection section.

Unlike the reference liquid wherein the concentration of the component to be measured is known, the fluorescence reference member does not have a reference value that has been specified from the beginning, Then, it is necessary to certify the fluorescence reference member by using the reference liquid wherein the concentration of the object to be measured is known. Then, it is preferable that the water quality analysis system of this invention further comprises a storage section that stores relation data for calibration that indicates a relationship between the fluorescence intensity obtained by using the reference liquid wherein the concentration of the component to be measured is known and the fluorescence intensity obtained by using the fluorescence reference member, and the calculation unit calibrates the water quality analysis system by using the fluorescence intensity of the fluorescence reference member obtained by the light detection section at a time of calibration and the relation data.

In case of using the fluorescence reference member like the present claimed invention, it is necessary to use an ND filter appropriately selected by preparing the ND filters with various attenuation ratios in order to keep the amount of fluorescence incident on the light detection section within a predetermined range while suppressing the dispersion of the fluorescence amount of the fluorescence reference member. However, it is necessary to select the ND filter having an appropriate attenuation ratio, which makes the work complicated. For this reason, it is preferable to further comprise an angle change mechanism that changes a tilt angle of the fluorescence reference member to the light irradiation section and the light detection section. This is applied by that the amount of excitation fluorescence of the fluorescence reference member such as a fluorescence glass changes as the incident angle of the excitation light changes. By changing the tilt angle of the fluorescence reference member, it is possible to continuously change the amount of fluorescence detected by the light detection section. As a result of this, it is possible to fall the fluorescence amount that is incident on the light detection section within a predetermined range just by changing the angle without preparing the ND filters having various attenuation rates.

In order to make it easier to adjust the fluorescence reference member to a predetermined angle, it is preferable that the angle change mechanism changes the tilt angle of the fluorescence reference member in stages. In addition, in order to make it possible to freely set the tilt angle of the fluorescence reference member, it is preferable that the angle change mechanism changes the tilt angle of the fluorescence reference member continuously.

As a concrete embodiment of the angle change mechanism conceived is that the angle change mechanism comprises a reference member holding body that holds the fluorescence reference member and an adapter body that is fixed to the light irradiation section and the light detection section at a time of calibration and that supports the reference member holding body rotatably.

In addition, a calibration machine in accordance with this invention is used for calibrating a water quality analysis system that analyzes a component to be measured contained in a liquid sample and that comprises a light irradiation section that irradiates the liquid sample with a light having an excitation wavelength of the component to be measured, and a light detection section that detects fluorescence of the component to be measured emitted from the liquid sample, and is characterized by comprising a solid fluorescence reference member that emits fluorescence by the light of the light irradiation section and a jig for calibration that holds the fluorescence reference member and that provides the fluorescence reference member on an optical path between the light irradiation section and the light detection section at a time of calibration.

In addition, a sensor module that is used for a water quality analysis system that analyzes a component to be measured contained in a liquid sample by a fluorescence spectroscopy is one embodiment of this invention. More specifically, the sensor module in accordance with this invention is characterized by comprising a light irradiation section that irradiates the liquid sample with a light having an excitation wavelength of the component to be measured, a light detection section that detects fluorescence of the component to be measured emitted from the liquid sample, a sensor head that houses the light irradiation section and the light detection section and that is immersed in the liquid sample, and a fluorescence reference member that is mounted on the sensor head at a time of calibration and that emits the fluorescence by the light of the light irradiation section.

Furthermore, a method for calibrating a water quality analysis system in accordance with this invention is a method for calibrating the water quality analysis system that analyzes a component to be measured contained in a liquid sample by a fluorescence spectroscopy, and is characterized by comprising the water quality analysis system comprises a light irradiation section that irradiates the liquid sample with a light having an excitation wavelength of the component to be measured, a light detection section that detects fluorescence of the component to be measured emitted from the liquid sample, and a calculation unit that calculates a concentration of the component to be measured by using a fluorescence intensity of the obtained by the light detection section, and calibration is conducted by providing a fluorescence reference member that emits the fluorescence by the light of the light irradiation section on an optical path between the light irradiation section and the light detection section.

As a concrete calibration method conceived is a method for calibrating the water quality analysis system that further comprises a relation data for calibration generating step that generates a relation data for calibration indicating a relationship between the fluorescence intensity of the reference liquid, wherein a concentration of the component to be measured is known, obtained by a reference system to be a reference of the water quality analysis system and the fluorescence intensity of the fluorescence reference member obtained by the water quality analysis system, and at a time of calibration, the fluorescence reference member is arranged on an optical path between the light irradiation section and the light detection section, and calibration is conducted by using the fluorescence intensity obtained by the light detection section and the relation data for calibration obtained in the relation data for calibration generating step.

It is conceivable that the relation data for calibration generating step comprises a first relation data generation step that generates a first relation data indicating a relationship between the fluorescence intensity of the reference liquid obtained by the reference system and the fluorescence intensity of the fluorescence reference member obtained by the reference system, and a second relation data generation step that generates a second relation data indicating a relationship between the fluorescence intensity of the fluorescence reference member obtained by the reference system and the fluorescence intensity of the fluorescence reference member obtained by the water quality analysis system, and the relation data for calibration is generated by using the first relation data obtained in the first relation data generation step and the second relation data obtained in the second relation data generation step.

In order to secure the traceability of calibration, it is preferable that the light detection section of the reference system is calibrated by a designated calibration organization.

Effect of the Invention

In accordance with the above-mentioned present claimed invention, it is possible to calibrate the water quality analysis system without using organic fluorescent substances such as phenanthrene.

EXPLANATION OF THE CHARACTERS

100 . . . water quality analysis system
2 . . . light irradiation section
3 . . . light detection section
4 . . . calculation unit
401 . . . concentration calculation section
402 . . . storage section
403 . . . calibration section
5 . . . fluorescence glass (fluorescence reference member)
6 . . . sensor head
7 . . . signal cable
8 . . . adapter
9 . . . ND filter
10 . . . beam splitter
11 . . . optical window

BEST MODES OF EMBODYING THE INVENTION

A water quality analysis system in accordance with one embodiment of the present claimed invention is described below with reference to drawings.

<1. System Configuration>

The water quality analysis system 100 of this embodiment is a system that uses a fluorescence spectroscopy as a method for measuring a component to be measured contained in a liquid sample. The water quality analysis system 100 excites the component to be measured with an excitation light, detects the fluorescence from the component to be measured by the excitation light, and measures a concentration of the component to be measured. In this embodiment, the liquid sample is, for example, a scrubber effluent discharged from the SOx scrubber loaded on a ship, and the component to be measured is phenanthrene in the scrubber effluent.

Figure 1:
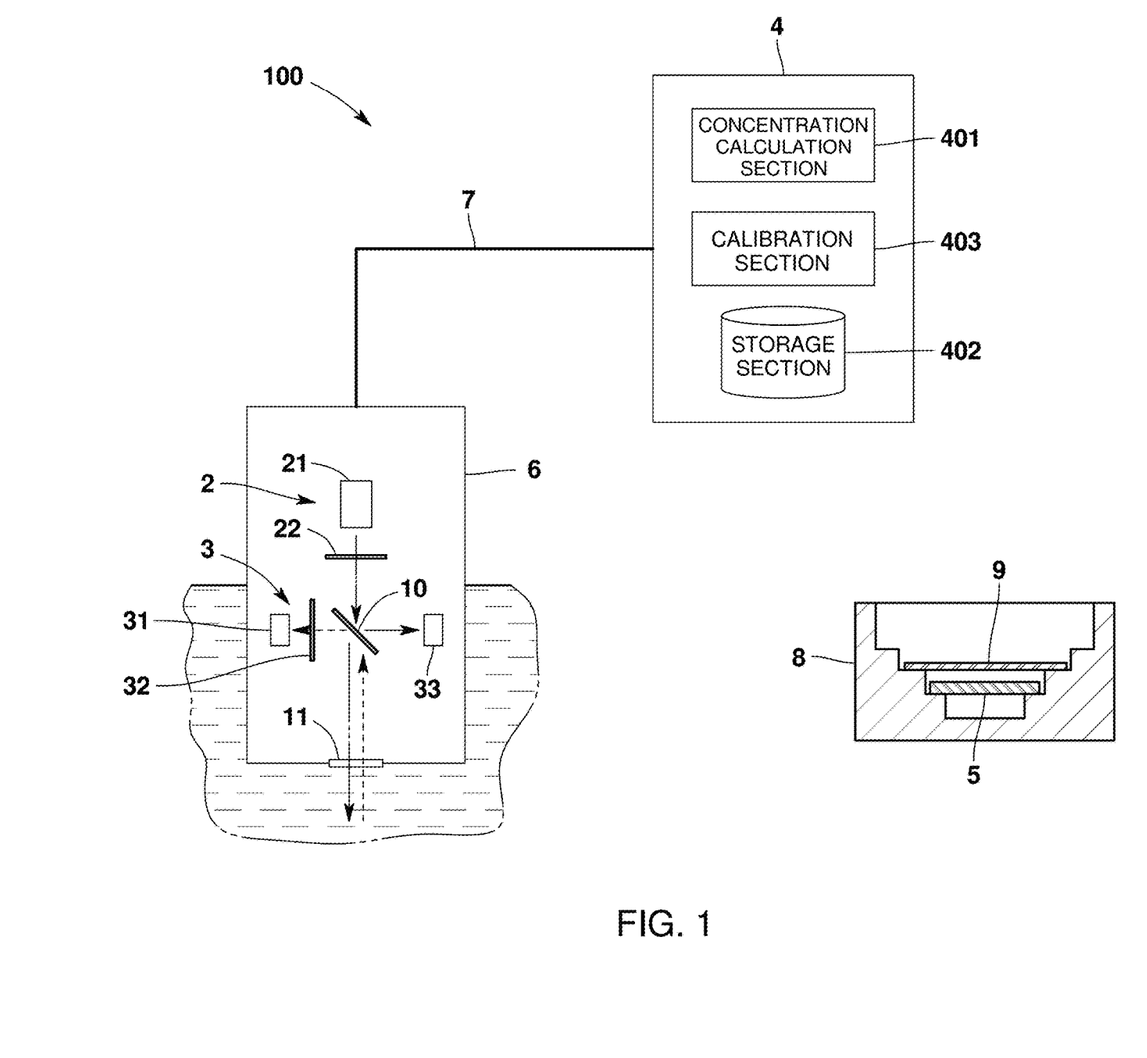
FIG. 1 is an overall schematic view of a water quality analysis system in accordance with one embodiment of the present claimed invention.

Concretely, as shown in FIG. 1, the water quality analysis system 100 comprises a light irradiation section 2 that irradiates a liquid sample with a light having the excitation wavelength of the component to be measured, a light detection section 3 that detects the fluorescence of the component to be measured emitted from the liquid sample, a calculation unit 4 that calculates the concentration of the component to be measured by using the fluorescence intensity obtained by the light detection section 3 and a solid fluorescence reference member 5 that generates the fluorescent light due to the light of the light irradiation section 2.

Each part is described below.

The light irradiation section 2 irradiates the excitation light with the excitation wavelength (254 nm) of phenanthrene as being the component to be measured and has an ultraviolet light source 21 that emits the light in the wavelength range including the excitation wavelength (254 nm), and a wavelength selective filter 22 that transmits the excitation wavelength (254 nm) from the light of the ultraviolet light source. By using this wavelength selective filter 22, it is possible to reduce dispersion of the excitation wavelength, and to reduce dispersion of a hand width of the excitation wavelength as well.

The light detection section 3 detects the light with the fluorescence wavelength (360 nm) of phenanthrene and has a photodetector 31 such as a photomultiplier tube (PMT) and a wavelength selective filter 32 that transmits the fluorescence wavelength (360 nm) from the light emitted from the liquid sample. By using this wavelength selective filter 32, it is possible to reduce dispersion of the fluorescence wavelength, and to reduce the dispersion of the bandwidth of the fluorescence wavelength as well.

In addition, the light detection section 3 of this embodiment has a monitoring photodetector 33 for monitoring the light intensity of the light irradiation section 2. This photodetector 33 uses, for example, a Si photodiode or a GaN ultraviolet detection element.

The light irradiation section 2 and the light detection section 3 of this embodiment are housed in a sensor head 6. The sensor head 6 is partially or fully immersed in the liquid sample, and the light irradiation section 2 and the light detection section 3 are housed at a distal end of the sensor head 6. The light irradiation section 2 and the light detection section 3 in the sensor head 6 are a coaxial illumination using a beam splitter 10, and an optical window 11 that transmits the excitation light irradiated to the liquid sample and the fluorescence from the liquid sample is arranged on a distal end surface of the sensor head 6. A signal cable 7 that transmits a fluorescence intensity signal obtained by the photodetector 31 to the calculation unit 4 is connected to a proximal end part of the sensor head 6.

The calculation unit 4 has a concentration calculation section 401 that calculates the concentration of phenanthrene-equivalent PAH contained in the scrubber effluent by obtaining the fluorescence intensity signal transmitted from the photodetector 31. In this embodiment, the concentration calculation section 401 of the calculation unit 4 calculates the concentration of the phenanthrene-equivalent PAH by calibrating the fluorescence intensity obtained by the photodetector 31 by an ultraviolet intensity obtained by the photodetector 33.

The fluorescence reference member 5 is a fluorescence glass composed of rare earth ions doped into glass. The fluorescence glass is, for example, a blue light-emitting glass, which is fluorophosphate glass containing divalent europium ions ($Eu^{2+}$) as the fluorescent active elements (rare earth ions). The fluorescence glass does not degrade due to storage or ultraviolet radiation and can be reused. The fluorescence glass has high heat resistance, high transparency, high optical homogeneity, and no toxicity.

In this embodiment, it is more preferable to use a plate-shaped fluorescence reference member rather 5 than a block-shaped one for reducing drop of the fluorescence intensity due to the inner filter effect (IFE effect). The IFE effect refers to absorption of the excitation light and the fluorescence by the fluorescence reference member itself.

Figure 2:
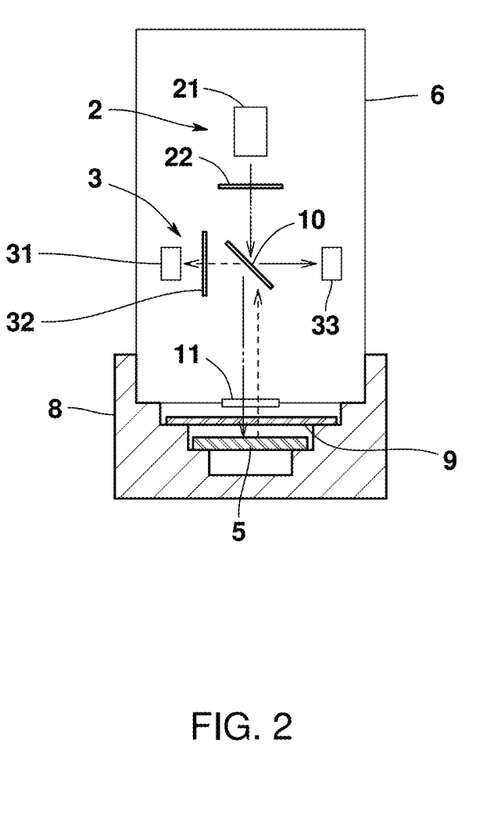
FIG. 2 is a schematic view showing a distal end part of a sensor head and a fluorescence glass adapter of this embodiment.

This fluorescence reference member 5 is removably mounted on the sensor head 6 and is held by an adapter 8 as being a jig for calibration. The fluorescence reference member 5 and the adapter 8 constitute the calibration equipment for calibrating the water quality analysis system 100. As shown in FIG. 2, the fluorescence reference member 5 held by the adapter 8 is arranged opposite to the optical window 11 on an optical path between the light irradiation section 2 and the light detection section 3 by mounting the adapter 8 on the distal end part of the sensor head 6. In addition, the water quality analysis system 100 is calibrated in a state that the adapter 8 is mounted on the sensor head 6. The adapter 8 may be provided with an ND filter 9. In case that the fluorescence intensity is strong, the ND filter 9 attenuates the irradiation intensity so that it is possible to set a distance between the optical window of the sensor head 6 and the fluorescence reference member 5 short, resulting in downsizing the adapter 8.

Then, in order to calibrate the water quality analysis system 100 using the fluorescence reference member 5, the calculation unit 4 has a storage section 402 that stores relation data for calibration that indicates a relationship between the fluorescence intensity obtained using the reference solution in which the concentration of the component to be measured is known and the fluorescence intensity obtained by using the fluorescence reference member 5, and a calibration section 403 that calibrates the water quality analysis system 100 by using the fluorescence intensity of the fluorescence reference member 5 obtained by the photodetector 31 and the relation data at a time of calibration.

<2. Method for Calibrating Water Quality Analysis System 100>

Next, a method for calibrating the water quality analysis system 100 will be explained.

First, generating the relation data for calibration used for calibrating the water quality analysis system 100 (relation data generation step for calibration) will be explained.

The relation data for calibration indicates a relationship between the fluorescence intensity of the reference liquid with a known concentration of the component to be measured obtained by the reference system 200 and the fluorescence intensity of the fluorescence reference member 5 obtained by the water quality analysis system 100.

In this embodiment, the reference system 200 is to be the reference for the water quality analysis system 100 as being an object to be calibrated and uses a photodetector (a reference detector 31×) that has been calibrated by an accredited calibration laboratory. An optical system of the reference system 200 is the same as that of the water quality analysis system 100, and physical conditions such as the arrangement of the light source, the wavelength selective filter or the like are the same. In addition, the detection wavelength and the sensitivity of the reference detector 31× have been verified by the accredited calibration laboratory. The accredited calibration laboratories are companies accredited by, for example, the National Institute of Standards and Technology (NIST) or the National Institute of Technology and Evaluation (ASNITE), or companies registered by the Japan Calibration Service System (JCSS).

Steps of generating the relation data for calibration have the following steps (a) and (b).

Figure 3A:
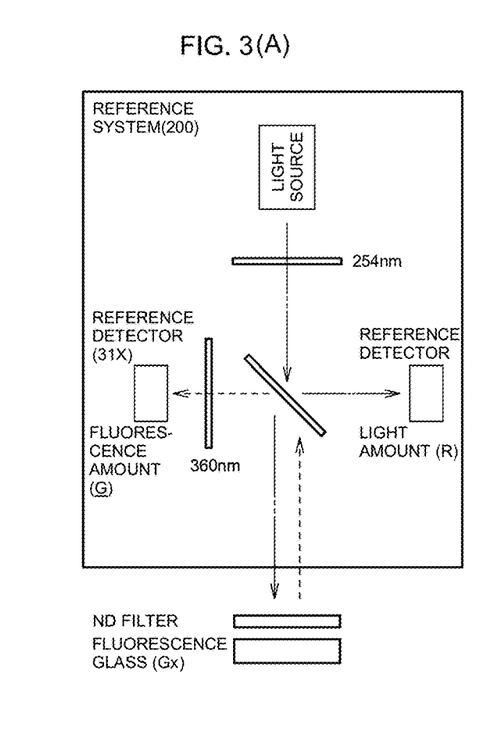
FIGS. 3(A) and 3(B) are schematic views showing one example of a method for calibration.
Figure 3B:
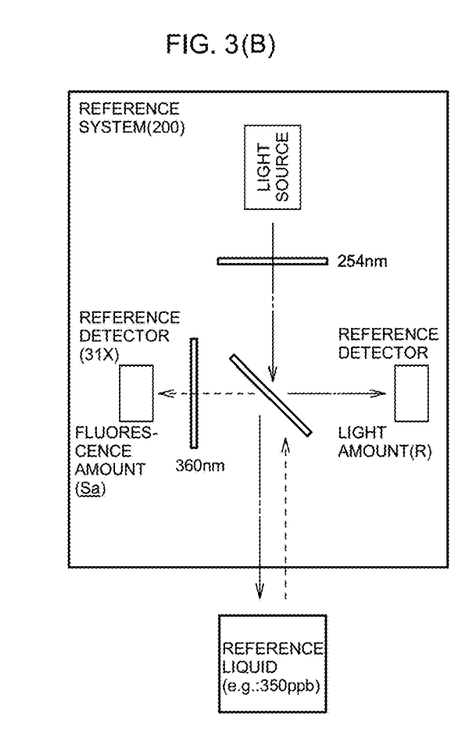
Figure 4A:
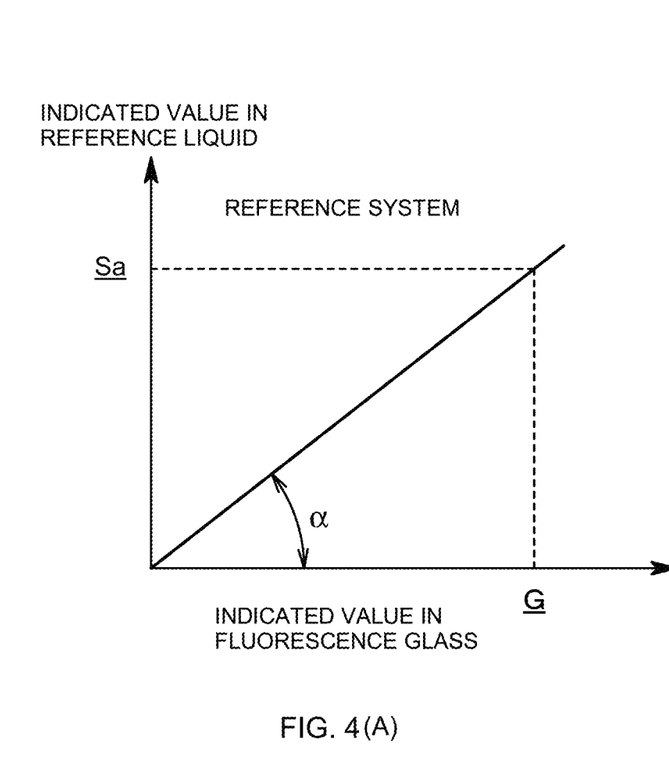
FIGS. 4(A) and 4(B) are views to explain a relation data for calibration generation step.

(a) (First relation data generation step) A first relation data ($\alpha$=Sa/G, FIG. 4(A)) that indicates the relationship between the fluorescence intensity (the fluorescent amount Sa, FIG. 3(B)) of the reference liquid (for example, the concentration of phenanthrene is 350 ppb) and the fluorescence intensity (the fluorescent amount G, FIG. 3(A)) of the fluorescence reference member 5 obtained by the reference system 200 is generated.

Figure 3C:
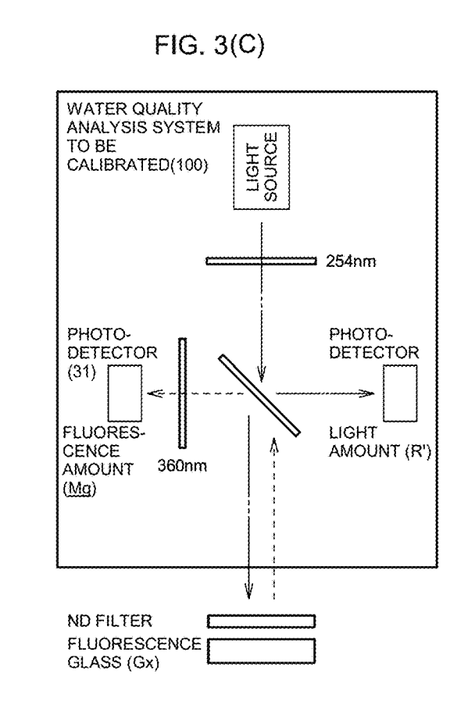
Figure 4B:
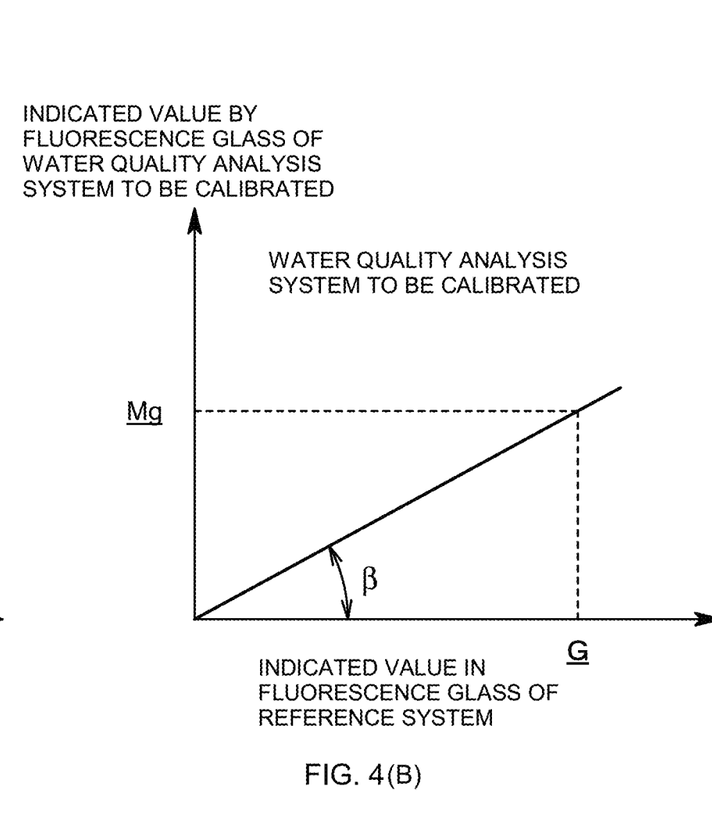

(b) (Second relation data generation step) A second relation data ($\beta$=Mg/G, FIG. 4(B)) that indicates the relationship between the fluorescence intensity (the fluorescent amount G, FIG. 3(A)) of the fluorescence reference member 5 obtained by the reference system 200 and the fluorescence intensity (the fluorescent amount Mg, FIG. 3(C)) of the fluorescence reference member 5 obtained by the water quality analysis system 100 is generated.

Then, the relation data for calibration is generated by using the first relation data ($\alpha$=Sa/G) obtained in the first relation data generation step and the second relation data ($\beta$=Mg/G) obtained in the second relation data generation step.

Concretely, in order to make the water quality analysis system 100, which is an object to be calibrated, equivalent to the reference system, the relationship $\alpha=\beta*K=(Mg/G)*K$ is established using the coefficient (K). From this relationship, K=Sa/Mg. By assigning this coefficient (K) to the fluorescence reference member 5, it is possible to calibrate the water quality analysis system 100. More specifically, this coefficient (K) becomes the relation data for calibration that is obtained for each of the fluorescence reference members 5. This relation data for calibration is stored in the storage section 402 of the calculation unit 4, for example, before a product is shipped.

The water quality analysis system 100 is calibrated periodically or at predetermined times by using the relation data for calibration obtained as described above, with its indicated value (phenanthrene-equivalent PAH concentration) checked periodically or at predetermined timings.

Concretely, the sensor head 6 is removed from a piping or a reservoir where the liquid sample flows, and the adapter 8 is attached to a distal end part of the sensor head 6. In this state, the fluorescence emitted from the fluorescence reference member 5, on which the excitation light is irradiated from the light irradiation section 2, is detected by the photodetector 31. The calibration section 403 of the calculation unit 4 calibrates the water quality analysis system 100 by using the fluorescence intensity obtained by the photodetector 31 and the relation data for calibration stored in the storage section 402.

<3. Effect of this Embodiment>

In accordance with the water quality analysis system 100 of this embodiment having the above arrangement, in case of calibrating the water quality analysis system 100, it is possible to perform calibration without using a conventional reference solution by arranging the solid fluorescence reference member 5 on the optical path between the light irradiation section 2 and the light detection section 3. In other words, it is possible to solve various problems resulting from using an organic system fluorescent substance such as phenanthrene. Since the solid fluorescence reference member 5 is higher in uniformity and heat resistance without discoloration nor toxicity than the organic system fluorescence reference member 5, it is possible to improve the workability and convenience of calibration. In addition, a method for storing the fluorescence reference member 5 is simplified, and there is no need of considering the life of the fluorescence reference member 5. Furthermore, it is possible to conduct inspections using the fluorescence reference member 5 easily and quickly.

Especially, in case of administering the phenanthrene-equivalent PAH concentration on board by using the water quality analysis system 100, the effect of the improved workability and convenience of this system in accordance with this embodiment is especially prominent. In addition, since it is possible for this water quality analysis system 100 to establish traceability, the reliability of phenanthrene-equivalent PAH concentration is improved, and the reliability of the data submitted to the Port State Control (PSC) is improved.

<4. Other Modified Embodiments>

The present claimed invention is not limited to the above-mentioned embodiments.

For example, the fluorescence reference member 5 in the above-mentioned embodiment is the fluorescence glass, however, it may be a fluorescent resin material in which a ceramic fluorescent material is doped into an organic high polymer material such as acrylic, or it may be a material in which a glass or organic high polymer material is coated with a ceramic fluorescent powder. In addition, the fluorescence reference member 5 may also be a gelatinous material to which a ceramic fluorescent material is added.

In addition, the optical system of the light irradiation section 2 and the light detection section 3 of the above-mentioned embodiment is the coaxial illumination using the beam-splitter, however, it may be arranged so that the optical axis of the light irradiation section 2 and the optical axis of the light detection section 3 intersect each other, or the light irradiation section 2 and the light detection section 3 may be arranged to face each other.

Furthermore, in the above-mentioned embodiment, the light of a single fluorescence wavelength is detected by irradiating the light of a single excitation wavelength, however, the light of multiple fluorescence wavelengths may be detected by irradiating the light of a single excitation wavelength. In this case, the fluorescence reference member 5 may have a fluorescent spectrum containing the above-mentioned multiple fluorescent wavelengths, or the water quality analysis system 100 may comprise multiple fluorescence members 5 corresponding to each of the fluorescence wavelengths. In addition, a mechanism that can select the light of each of the fluorescence wavelengths may be arranged in a side of the light detection section 3.

In the above-mentioned embodiment, the fluorescence reference member 5 is held by the adapter 8, however, it may be configured to be mounted on the water quality analysis system 100 only by the fluorescence reference member 5 without being held by the adapter 8.

Furthermore, in the arrangement of the above-mentioned embodiment, it may be configured to change the tilt angle of the fluorescence reference member 5 relative to the light irradiation section 2 and the light detection section 3. Concretely, it is conceivable that the adapter 8, which is the jig for calibration, comprises an angle change mechanism 12 to change the tilt angle of the fluorescence reference member 5 relative to the light irradiation section 2 and the light detection section 3. This angle change mechanism 12 is configured to change the tilt angle of the fluorescence reference member 5 step by step or continuously.

Figure 5:
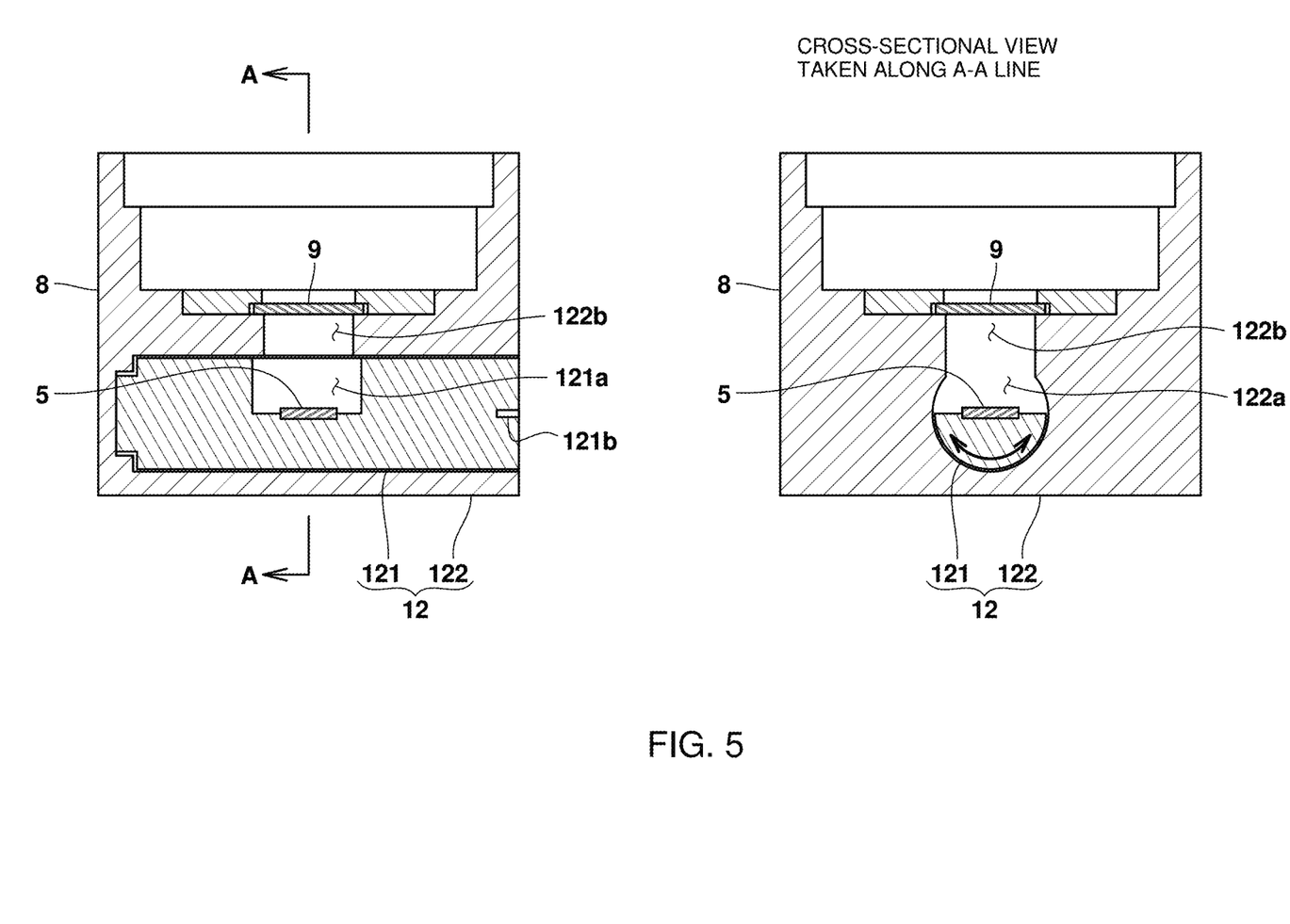
FIG. 5 is a cross-sectional view showing an adapter having an angle change mechanism of a modified embodiment.

Concretely, as shown in FIG. 5, the angle change mechanism 12 comprises a reference member holding body 121 that holds the fluorescence reference member 5, and an adapter body 122 that is fixed to the light irradiation section 2 and the light detection section 3 at a time of calibration and that rotatably supports the reference member holding body 121. The reference member holding body 121 is cylindrical and has a mounting recess 121a on its side wall to accommodate and mount the fluorescence reference member 5. In addition, the adapter body 122 has a housing hole 121a to accommodate the cylindrical reference member holding body 121 in a rotatable manner. An ND filter 9 is fixed to the adapter body 122, and a connecting part 122b that is in communication with the housing hole 122a is formed in the lower part of the ND filter 9. In addition, the reference member holding body 121 can be rotated by using the rotation engaging section 121b (for example, a flatheaded screwdriver groove) formed on an end face thereof in a state that the reference member holding body 121 is housed in the adapter body 122, thereby changing the tilt angle of the fluorescence reference member 5 relative to the light irradiation section 2 and the light detection section 3.

Figure 6:
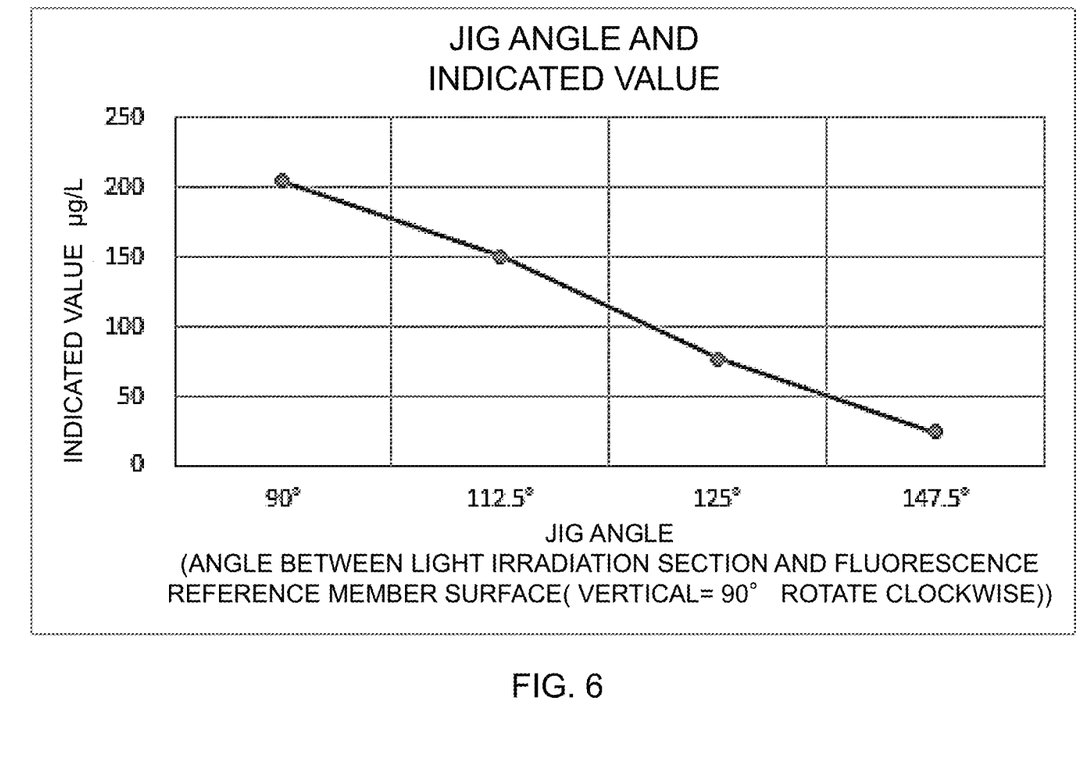
FIG. 6 is a graph showing an indicating value of a sensor in case of changing a tilt angle by the angle change mechanism.

It is possible for the above-mentioned angle change mechanism 12 to change the fluorescence amount detected by the light detection section 3 at least at two points. For example, it can be conceived that calibration is conducted by increasing the tilt angle of the reference member holding body 121 to lessen the fluorescence amount when the measurement range is narrow (for example, 0-500 ppb), and by decreasing the tilt angle of the reference member holding body 121 to increase the fluorescence amount when the measurement range is wide (for example, 0-5000 ppb). It can be conceived that the tilt angle of the reference member holding body 121 is changed in accordance with each of the water quality analysis systems 100 having various measurement range. In addition, the linearity of the measured values of the water quality analysis system 100 can also be checked by changing the tilt angle of the reference member holding body 121 using the above-mentioned angle change mechanism 12 after calibration and by looking at the measured values at that time. FIG. 6 shows the indicated values when the tilt angle is changed by the angle change mechanism 12.

Furthermore, the reflector may be placed on a lower surface of the fluorescence reference member 5 (fluorescence glass). In addition, a shape (an area) of the reflector placed on the lower surface of the fluorescence reference member 5 (fluorescence glass) may be configured to be changeable.

In addition, the jig for calibration (the adapter 8) having the above-mentioned angle change mechanism 12 can be used as a checker to inspect a sensor having the light irradiation section 2 and the light detection section 3. Concretely, the tilt angle of the reference member holding body 121 is changed by the above-mentioned angle change mechanism 12 and the sensor can be inspected based on whether or not the indicated value of the sensor changes according to the changed tilt angle.

In the above-mentioned embodiment, the water quality analysis system 100 measures the concentration of PAH in the scrubber effluent, however, it may also be used to measure the concentration of other components to be measured, such as a dissolved organic matter (DOM) contained in other liquid samples.

The water quality analysis system 100 of the above-mentioned embodiment is of the immersed type, however, it may be of, for example, a batch cell type or a flow cell type wherein measurement is conducted with the liquid sample housed in a cell.

In addition, the embodiment may be variously modified or combined without departing from a spirit of the present claimed invention.

Possible Applications in Industry

In accordance with the present claimed invention, it is possible to conduct calibration on the water quality analysis system without using an organic fluorescent material such as phenanthrene.

The invention claimed is:

1. A water quality analysis system that measures a concentration of a component contained in a liquid sample by a fluorescence spectroscopy, comprising
a light irradiation section that irradiates the liquid sample with a light having an excitation wavelength of the component,
a light detection section that detects fluorescence of the component-to be measured emitted from the liquid sample,
a sensor head that houses the light irradiation section and the light detection section, and that is immersed in the liquid sample,
a calculation unit that calculates a concentration of the component by using a fluorescence intensity obtained by the light detection section, and
a fluorescence reference member that is arranged on an optical path between the light irradiation section and the light detection section during calibration of the water quality analysis system, wherein
the fluorescence reference member is detachably mounted on the sensor head,
the fluorescence reference member emits fluorescence upon excitation by the light irradiation section, and
the fluorescence reference member is solid, non-toxic, and not subject to photodegradation.

2. The water quality analysis system described in claim 1, wherein
the fluorescence reference member is glass.

3. The water quality analysis system described in claim 1, wherein
the liquid sample is a scrubber effluent discharged from a ship, the scrubber effluent containing polycyclic aromatic hydrocarbons (PAH), including phenanthrene,
the light irradiation section emits light having the excitation wavelength of the phenanthrene contained in the scrubber effluent,
the light detection section detects the fluorescence of the phenanthrene, and
the calculation unit calculates a phenanthrene-equivalent PAH concentration contained in the scrubber effluent by using the fluorescence intensity obtained by the light detection section.

4. The water quality analysis system described in claim 1, further comprising
a storage section that stores relation data for calibration that indicates a relationship between the fluorescence intensity obtained by using a reference liquid wherein the concentration of the component is known and the fluorescence intensity obtained by using the fluorescence reference member, wherein
the calculation unit calibrates the water quality analysis system by using the fluorescence intensity of the fluorescence reference member obtained by the light detection section at a time of calibration and the relation data.

5. The water quality analysis system described in claim 1, further comprising an adaptor that rotatably holds the fluorescence reference member such that a tilt angle of the fluorescence reference member with respect to the light irradiation section and the light detection section can be changed.

6. The water quality analysis system described in claim 5, wherein
the adaptor changes the tilt angle of the fluorescence reference member in stages or continuously.

7. The water quality analysis system described in claim 5, wherein
the adaptor comprises a reference member holding body that holds the fluorescence reference member and an adapter body that is fixed to the light irradiation section and the light detection section at a time of calibration and that rotatably supports the reference member holding body.

8. The water quality analysis system described in claim 1, wherein
the solid fluorescence reference member is mounted on the sensor head during calibration.

9. The water quality analysis system described in claim 1, further comprising
a jig for calibration that holds the fluorescence reference member and that provides the fluorescence reference member on an optical path between the light irradiation section and the light detection section at a time of calibration.

10. A method for calibrating the water quality analysis system described in claim 1, the method comprising
generating a relation data for calibration, the relation data indicating a relationship between a fluorescence intensity of a reference liquid obtained by a reference system and a fluorescence intensity of the fluorescence reference member obtained by the water quality analysis system, wherein
the reference liquid includes a known concentration of the component.

11. The method for calibrating the water quality analysis system described in claim 10, further comprising at a time of calibration, arranging the fluorescence reference member on the optical path between the light irradiation section and the light detection section, and
calibrating the water quality analysis system with the fluorescence intensity obtained by the light detection section and the relation data for calibration.

12. The method for calibrating the water quality analysis system described in claim 11, wherein
generating the relation data for calibration comprises
generating first relation data indicating a relationship between the fluorescence intensity of the reference liquid obtained by the reference system and the fluorescence intensity of the fluorescence reference member obtained by the reference system, and
generating second relation data indicating a relationship between the fluorescence intensity of the fluorescence reference member obtained by the reference system and the fluorescence intensity of the fluorescence reference member obtained by the water quality analysis system, and
the relation data for calibration is generated by using the first relation data and the second relation data.

13. The method for calibrating the water quality analysis system described in claim 11, wherein
prior to calibrating the water quality analysis system, the light detection section of the reference system is calibrated.

* * * * *

UNITED STATES PATENT AND TRADEMARK OFFICE
CERTIFICATE OF CORRECTION

PATENT NO. : 12,436,105 B2
APPLICATION NO. : 17/595348
DATED : October 7, 2025
INVENTOR(S) : Kiichiro Tomioka and Yuta Hashima Page 1 of 1

It is certified that error appears in the above-identified patent and that said Letters Patent is hereby corrected as shown below:

In the Claims

Column 11, Line 17, Claim 1, delete "-to be measured"

Signed and Sealed this
Third Day of February, 2026

John A. Squires
*Director of the United States Patent and Trademark Office*